Dec. 2, 1952 M. V. ALBAUGH 2,619,835
MACHINE FOR TESTING HYDRAULIC TAPPETS
Filed July 16, 1949 7 Sheets-Sheet 1

Inventor
Merton V. Albaugh
By Spencer, Willits, Helwig & Bailleo
Attorneys

Dec. 2, 1952 M. V. ALBAUGH 2,619,835
MACHINE FOR TESTING HYDRAULIC TAPPETS
Filed July 16, 1949 7 Sheets-Sheet 2

Inventor
Morton V. Albaugh
By
Spencer, Willits, Helmig & Baillio
Attorneys

Dec. 2, 1952 M. V. ALBAUGH 2,619,835
MACHINE FOR TESTING HYDRAULIC TAPPETS
Filed July 16, 1949 7 Sheets-Sheet 4

Inventor
Merton V. Albaugh
By
Spencer, Willits, Helwig & Baillio
Attorneys

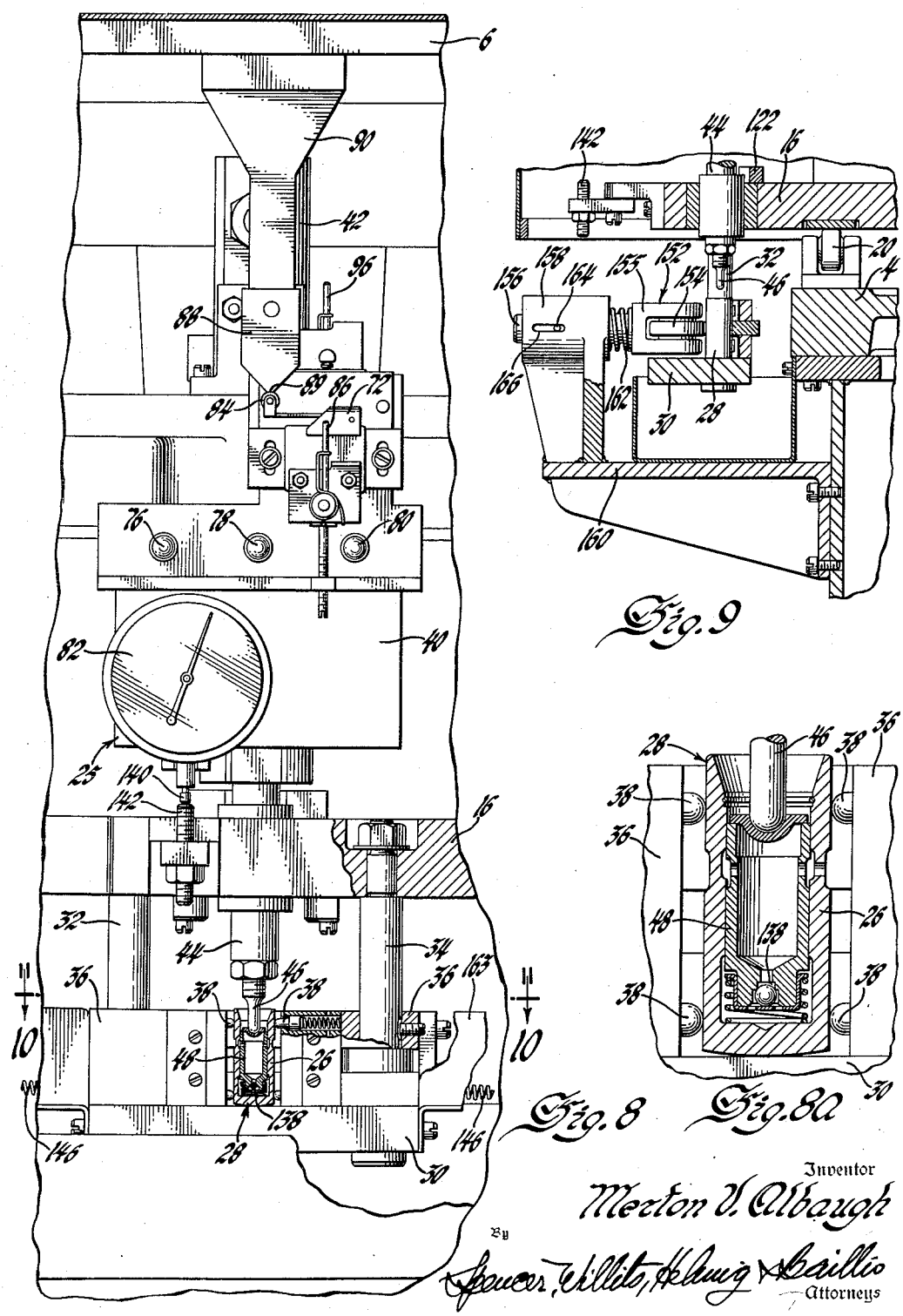

Dec. 2, 1952 M. V. ALBAUGH 2,619,835
MACHINE FOR TESTING HYDRAULIC TAPPETS
Filed July 16, 1949 7 Sheets-Sheet 6

Inventor
Merton V. Albaugh
By
Spencer, Willits, Helmig & Caillio
Attorneys

Dec. 2, 1952 M. V. ALBAUGH 2,619,835
MACHINE FOR TESTING HYDRAULIC TAPPETS
Filed July 16, 1949 7 Sheets-Sheet 7

Inventor
Merton V. Albaugh
By
Spencer, Willits, Helwig & Caillio
Attorneys

Patented Dec. 2, 1952

2,619,835

UNITED STATES PATENT OFFICE 2,619,835

MACHINE FOR TESTING HYDRAULIC TAPPETS

Merton V. Albaugh, Grand Rapids, Mich., assignor to General Motors Corporation, Detroit, Mich., a corporation of Delaware Application July 16, 1949, Serial No. 105,138

9 Claims. (Cl. 73—119)

The invention relates to and has as its general object to provide an improved machine for testing hydraulic self-adjusting valve tappets and the like for proper leak-down and check-valve recovery under simulated operating conditions.

The machine hereinafter described and claimed represents an improvement in a number of respects over that disclosed in the Dennis H. Kelly application Serial No. 42,372 filed August 4, 1948. A common form of hydraulic tappet, and which is adapted for testing in the machine of my invention, comprises a vertical cup shaped cylinder closed in its upper end by a piston or plunger telescopically slidable and supported therein on a column of oil or other fluid confined in the bottom of the cylinder. The cylinder is slidably supported in the engine frame for longitudinally reciprocable movement in following one of the lobes on the camshaft, the piston moving therewith under the action of the oil column and effecting through suitable linkage a corresponding movement of the engine valve which is biased to closed position by a relatively stiff spring. The piston is provided with a passage extending longitudinally therethrough which is closable by a check-valve sensitive to pressure within the chamber below the piston but which opens upon removal of that pressure to permit a flow of oil into the chamber from a reservoir above the piston, thereby tending to keep the pressure chamber filled at all times. A light spring is provided to bias the piston upwardly in the cylinder and thereby expand the tappet to take up the valve lash during the interval between lifting strokes when the engine valve spring is unstressed.

In order that hydraulic tappets of this general type may perform properly to maintain zero lash in an engine valve linkage, two functions are essential. The first of these is referred to as "leak-down" and is the rate at which the tappet collapses under load due to leakage of oil by the piston from the pressure chamber into the reservoir. A certain minimum leak-down is necessary to allow the tappet to collapse a sufficient amount to compensate for the thermal expansion of the other members of the valve linkage during engine warm-up and a maximum limit of leak-down is necessary to insure that the amount of oil displaced from the pressure chamber during one engine valve lifting stroke is not more than can be returned through the check-valve to the pressure chamber during the lull before the next stroke. The second necessary function is referred to as "check-valve recovery," or "ball recovery" in tappets employing a ball shaped check-valve, and is represented by the distance which the tappet will collapse upon a sudden application of load downwardly on the piston while the check-valve is closing from its fully open position. While this value must not exceed that which will insure sufficient engine valve opening and avoid excessive working of the tappet, it is also a measure of the capacity of the check-valve to pass oil from the reservoir to the pressure chamber and allow the tappet to expand when the load thereon is removed, and hence has a minimum as well as a maximum desirable limit.

In the prior machine disclosed in the Kelly application above referred to, the loading of the tappet for the leak-down test was effected by allowing a weight to move downwardly solely by force of gravity into engagement with the tappet piston, and the time required for the weight to force the tappet piston a predetermined distance inwardly in its cylinder was recorded by an electric clock which was started and stopped by switches actuated by the falling of the weight. While this prior machine has performed generally satisfactorily, it frequently happens that the check-valve of the tappet being tested does not reach a fully seated position prior to the start of the measured leak-down range. Hence it is one of the principal objects of the instant invention to provide a positive initial foreshortening of the tappet preliminary to the start of the leak-down test in order to insure a full seating of the tappet's check-valve.

Additional objects of the instant invention relate to the improved means for indicating the rate of leak-down of the tappets, and the simplification of the structural organization of parts for controlling the movements of the tappet loading weights during the test cycle.

In the drawings:

Figures 5, 6, 7 and 9 are enlarged fragmentary sectional views taken on correspondingly numbered lines of Figure 3.

Figure 8 is an enlarged elevational view of one of the tappet test stations, taken from line 8—8 of Figure 3, certain parts shown broken away and in section.

Figure 8a is a further enlarged fragmentary view, similar to Figure 8, showing the details of construction of a representative form of tappet and the elements of the machine which support it in the test station.

Figure 1:
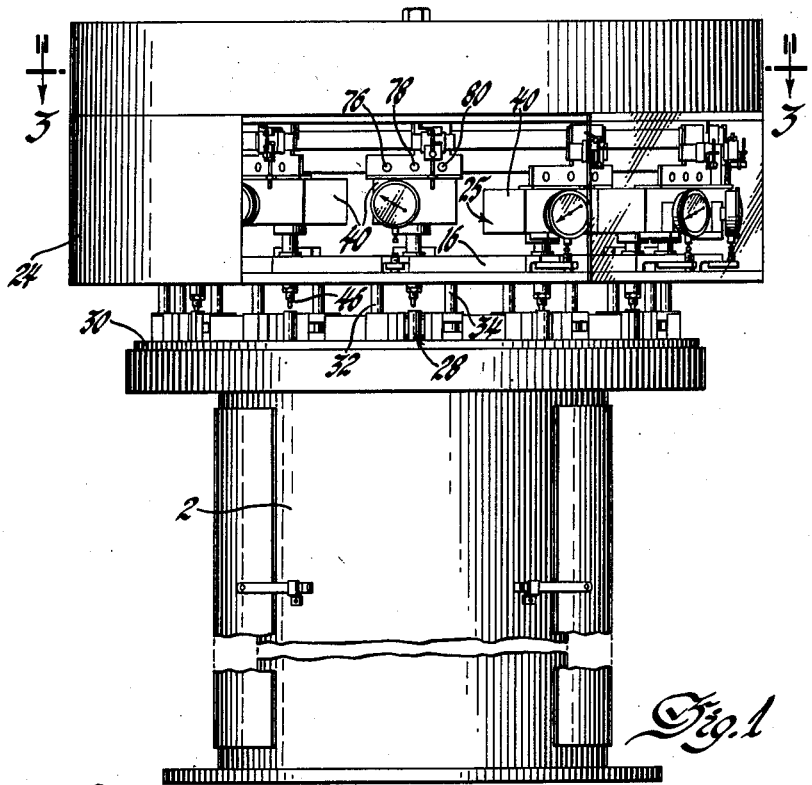
Figure 1 is a general elevational view of a machine embodying the invention, and showing valve tappets in positions thereon for test.
Figure 5:
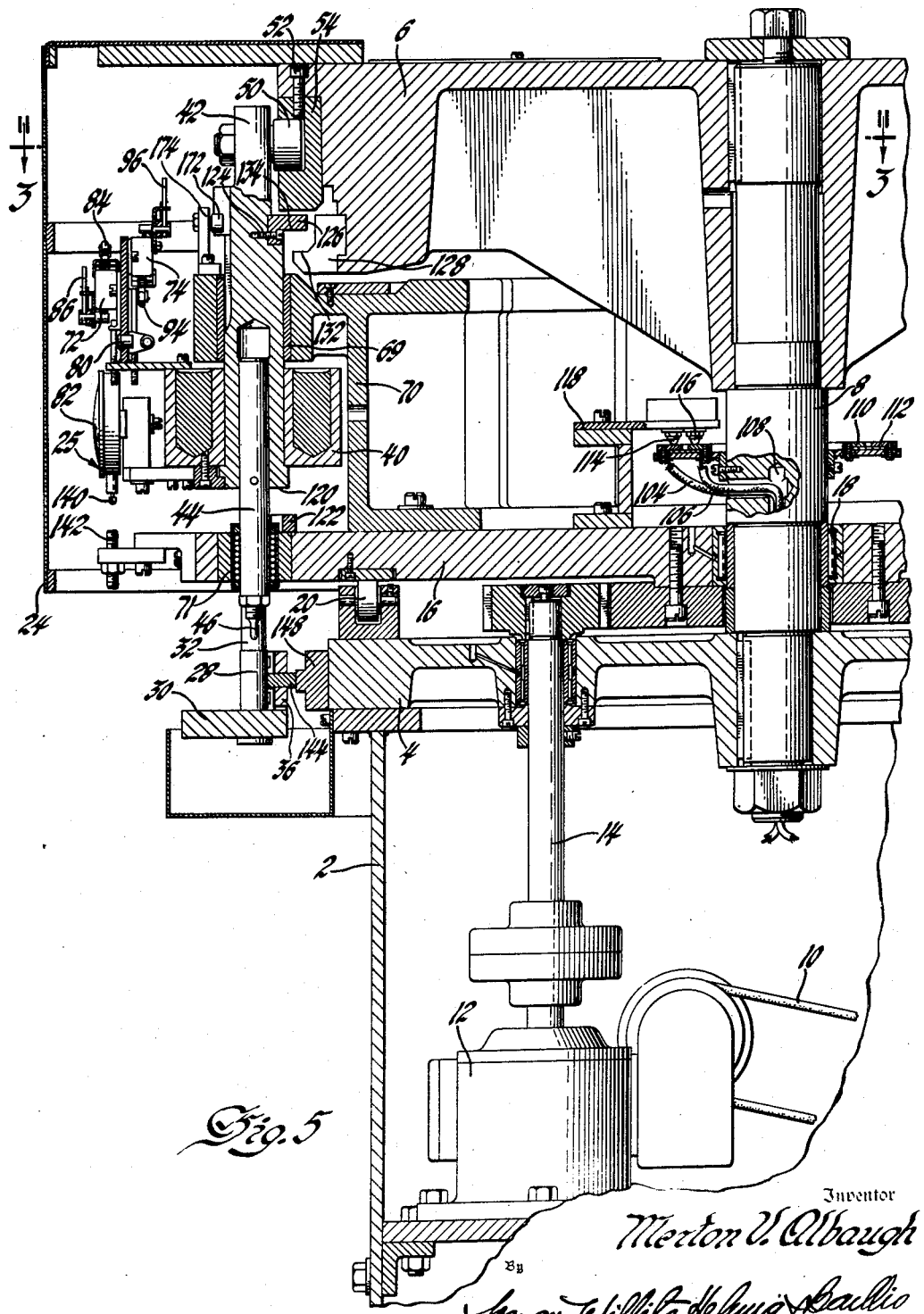
Figure 6:
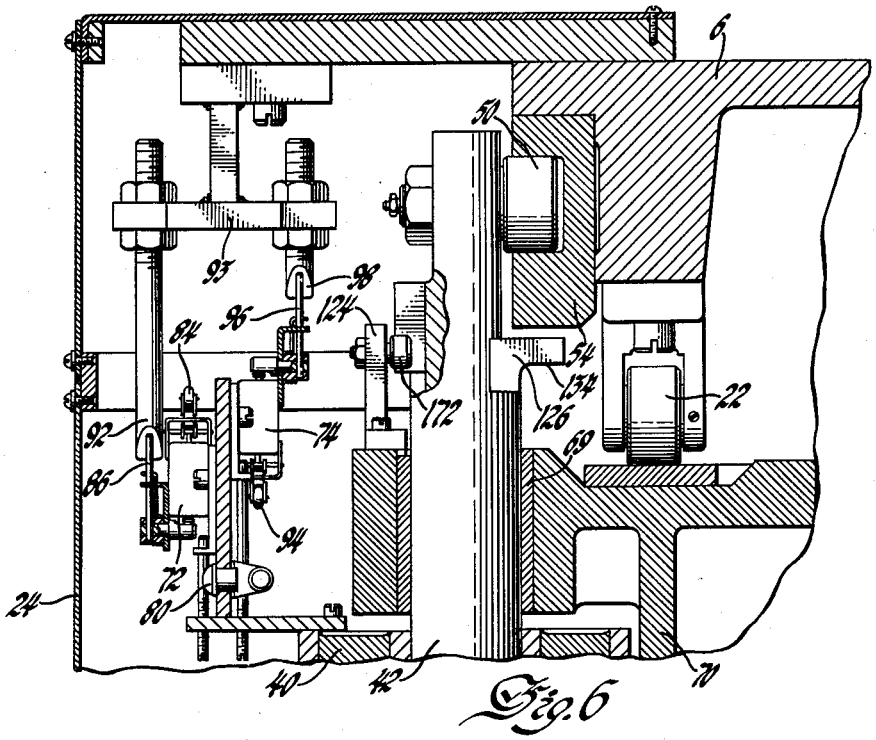
Figure 7:
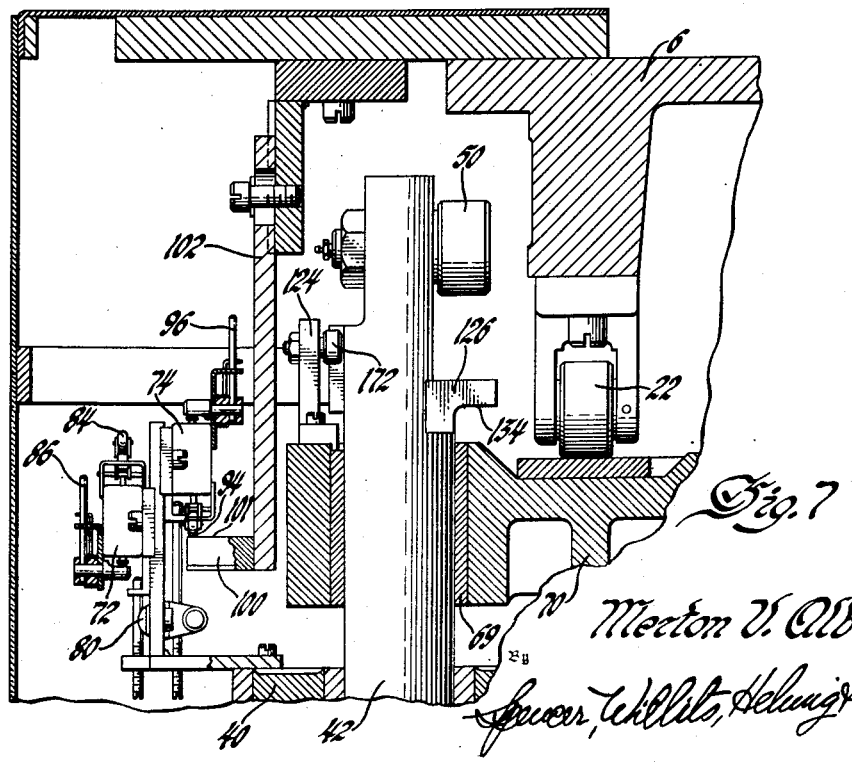

The machine as shown in the drawings comprises a stationary supporting frame or pedestal 2, (Figure 1) to the upper end of which are fixedly mounted upper and lower carriage supporting structures 6 and 4, respectively, rigidly interconnected by a central post 8 (Figure 5). Mounted within the pedestal 2 is a driving motor (not shown) which is connected through the belt 10, speed reducer 12 and driving shaft 14 to effect a continuous rotation of carriage 16 at a uniform speed, e. g. 1⅔ R. P. M. This carriage is journaled at the bearing 18 to the post 8 and is thrustably supported between upper and lower rollers 22 (Figures 6, 7) and 20 (Figures 5, 9), which are rotatably mounted at circumferentially spaced points around the post 8 to the carriage supporting structures 4 and 6, respectively. A hood 24 attached to the upper structure 6 serves to partially enclose the upper portion of the machine, there being a cut-out section at the front of the machine to accommodate insertion and renewal of tappets and inspection of the test instruments.

Figures 3, 4:
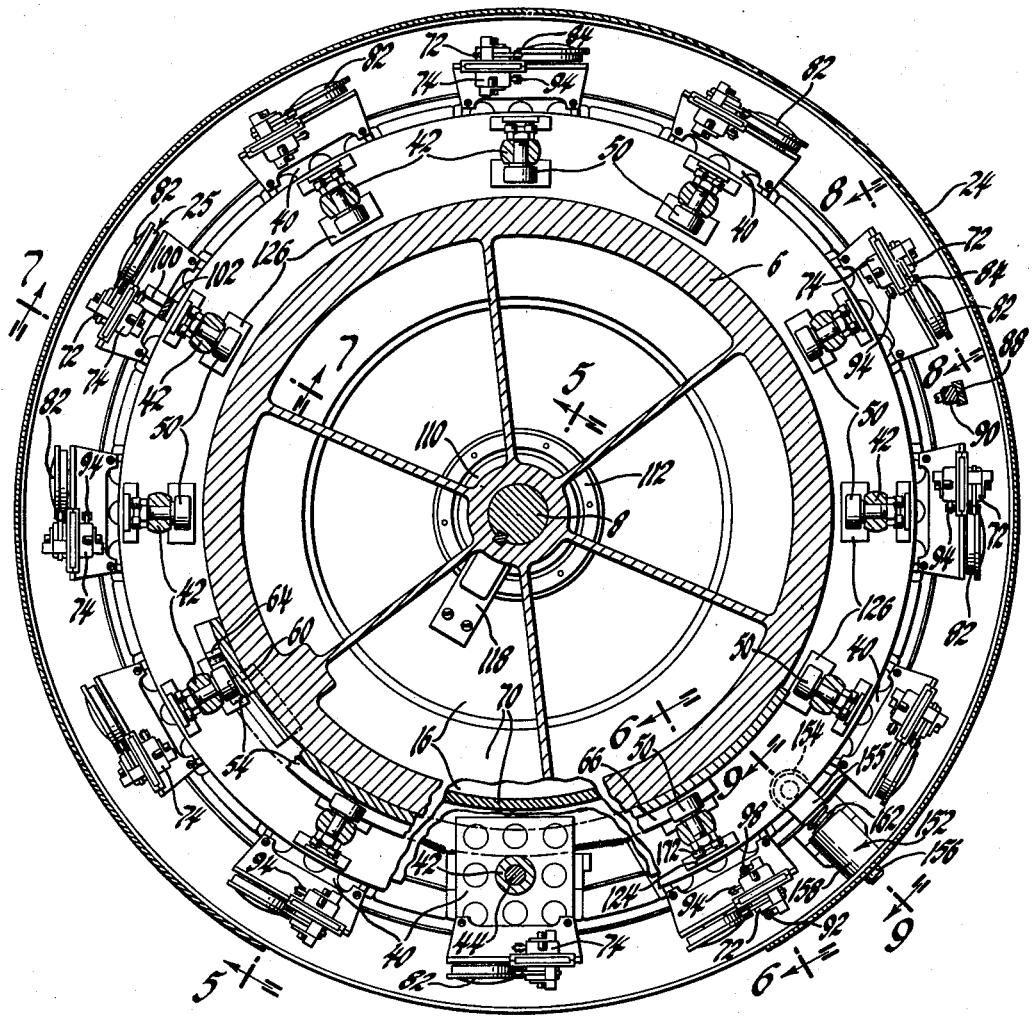
Figure 3 is a plan view of the machine taken from line 3—3 of Figure 1, with portions broken away and in section.
Figure 4 is an enlarged perspective view of the cam member which controls the vertical movements of the tappet loading weights.

Circumferentially spaced around the carriage 16 are a plurality (12, as shown) of tappet test stations, designated generally by the numeral 25 (Figure 3). Each test station includes a supporting means for the cylinder 26 (Figure 8) of a tappet 28, comprising a platform member 30 disposed outwardly from the periphery of the lower supporting structure 4 and rigidly suspended from the carriage 16 as by bolts 32 and 34. Secured on the platform 30 by the bolts 32 and 34 is a U-shaped block 36 (Figure 10), for locating the tappet cylinder as it rotates around with the carriage during the test. Fitted in the arms of the block are spring pressed buttons 38 (Figure 8) which resiliently engage the sides of the tappet cylinder to retain it in place.

Suspended above the carriage 16 opposite each tappet supporting block 36 is a weight 40 (of the order of 50 lbs.) on an arbor 42. A downward extension 44 of the arbor carries a nose piece 46 at its lower end which is adapted to contact the upper end of the tappet piston 48 (Figure 8), and the upper end of the arbor 42 has attached thereto a roller follower 50 (Figures 2, 5, 6, 7).

Figure 11:
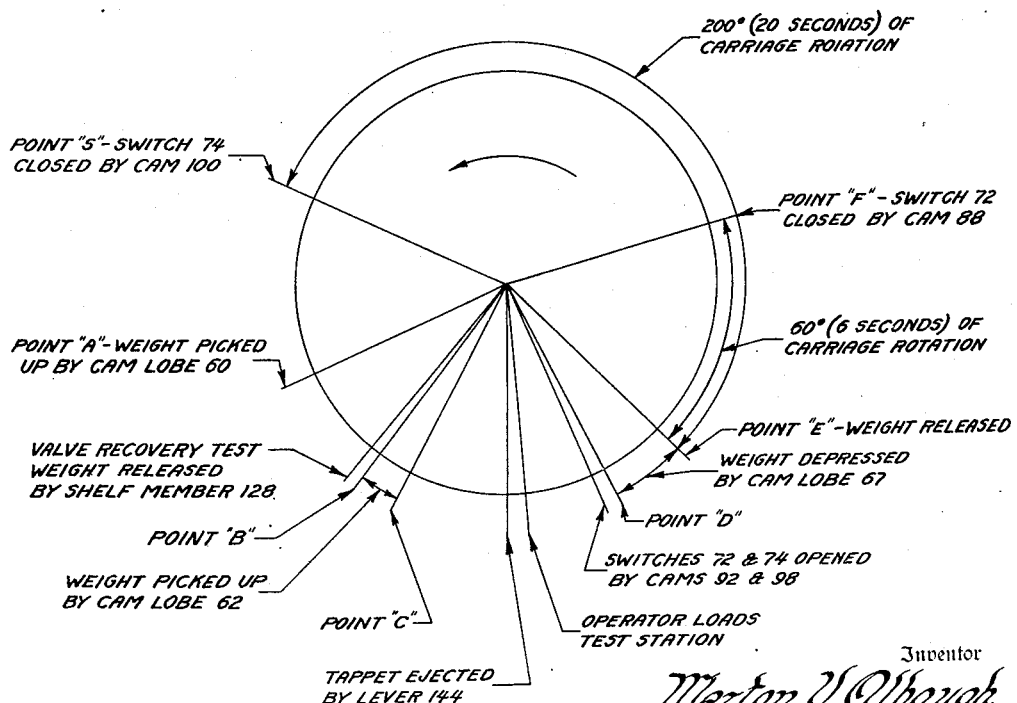
Figure 11 is a diagram showing the timing of the different events occurring during one cycle of a test station.

Fixed to the outer periphery of the upper supporting structure 6, as by screws 52 (Figure 5), is a double track cam member 54 which controls the vertical movements of each weight 40 during the test cycle. As best shown in Figure 4, the cam member 54 is arcuate in shape and has an upper cam surface or track 56 and a lower cam track 58 between which each successive roller follower 50 passes during one revolution of the carriage 16. The lower cam track 58 has two circumferentially spaced apart raised portions or lobes 60 and 62 respectively, the former having only a short dwell section 64 and the latter an extended dwell section 66. In the diagram of Figure 11 which shows the timing of events during each test cycle, i. e. one revolution of a test station with the carriage 16, point "A" represents the general location of lobe 60, and points "B" and "C" represent the start and end, respectively, of the approach to the dwell section 66 of lobe 62. The upper cam track 56 has a single lobe 67, the approach side 68 of which commences and ends at points "D" and "E," respectively, in said timing diagram.

Each of the weight carrying arbors 42 are slidably guided for vertical movement in bearings 69 (Figures 2, 5, 6, 7) provided therefor in a superstructure 70 fixedly mounted atop the carriage 16, and the arbor extension 44 is guided for similar movement in an anti-friction bearing 71 (Figure 5) in the carriage 16. Attached by suitable brackets to each weight 40 for movement therewith are two micro-switches 72 and 74, three indicating lamps 76, 78 and 80, and a dial indicator 82.

Each micro-switch 72 controls the energization of its associated lamp 76, and each micro-switch 74 correspondingly controls its associated lamp 80. The switches 72 each have a switch closing lever 84 and a switch opening or reset lever 86, the closing of each switch 72 being effected by downward movement of its closing lever 84 relative thereto. Adapted to successively actuate each of the switches 72 to closed position when engaged by their closing levers 84 is a downwardly extending stationary cam 88 (Figure 8) adjustably fixed to the upper supporting structure 6 by a bracket 90. The lower extremity 89 of cam 88 is angularly located at point "F" (Figure 11) which is 60 degrees in the direction of rotation of the carriage from point "E" previously referred to, and is at a height such that it will be engaged by the switch closing levers 84 only in the event that their respective weights 40 do not move them too far down during the 60 degrees (six seconds) of carriage rotation to permit such engagement which, in turn, depends on the tappets demonstrating leak-down rates at or below a specified maximum. 92 is a stationary cam, fixed as by the bracket 93 to the upper supporting structure 6, which trips the opening lever 86 of each successive switch 72 to switch open position as the respective test stations start each revolution or test cycle with the carriage 16.

Similarly, each switch 74 is provided with a switch closing lever 94 and a switch opening lever 96, the closing of each of these switches being effected by upward movement of its closing lever relative thereto. The switch opening lever 96 is actuated by a cam 98, also fixedly supported by the bracket 93, simultaneously with the opening of the switch 72 by the cam 92. Adapted to successively actuate each switch 74 when engaged by their closing levers 94 is an upwardly extending cam 100 (Figure 7) adjustably fixed to the upper supporting structure by a bracket 102. The upper extremity 101 of the cam 100 is angularly located at point "S" (Figure 11) which is 200 degrees in the direction of carriage rotation from point "E," and is at the same height as the lower extremity 89 of cam 88 so that it will be engaged by the switch closing levers 94 only in the event that their respective weights 40 move them a sufficient distance down during the 200 degrees (20 seconds) of carriage rotation to permit such engagement which, in turn, depends on the tappets demonstrating leak-down rates at or above a specified minimum. It will thus be understood that the two switch actuating cams 88 and 100 serve in conjunction with the uniform speed of rotation of the carriage 16 to check each successive tappet for its ability to leak down a predetermined distance, e. g. 1/16 inch, within a prescribed time range, e. g. 6–20 seconds.

Current leads 104 and 106 (Figure 5) for operating the lamps 76, 78 and 80 are brought up through a passageway 108 in the post 8 to stationary slip rings 110 and 112 on the post from which the current is delivered to brushes 114 and 116 mounted on a bracket 118 which in turn is secured to the carriage 16. The brushes 114 and 116 are connected through a suitable junction box (not shown) to the center lamp 78 of each test station, from which the lamps 76 and 80 associated therewith are supplied in parallel through their switches 72 and 74, respectively. The center lamp 78 thus serves as a pilot to indicate the operativeness of the current supply from the junction box to each of the respective switches 72 and 74.

Figure 12:
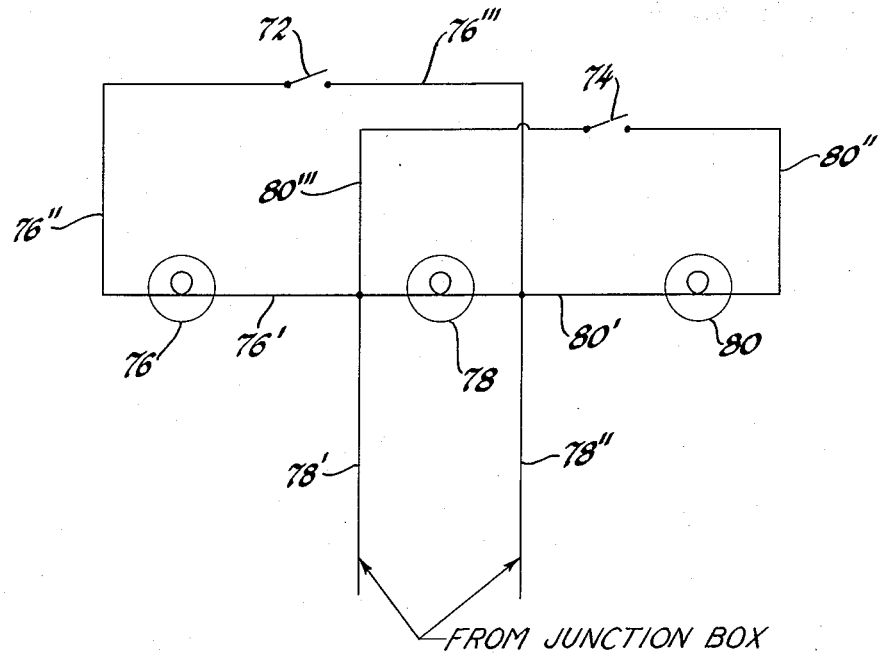
Figure 12 is a circuit diagram of the electrical interconnections of the signal means and their control switches employed with each test station.

These electrical connections of the switches 72, 74 and lamps 76, 78, 80 to the junction box are diagrammed in Figure 12, wherein the conductors 78', 78'' feed the center lamp 78, from which the lamps 76 and 80 are supplied in parallel through their switches 72 and 74 by conductors 76', 76'', 76''' and 80', 80'' and 80''', respectively.

Downward movement of each weight 40 is limited by the lower end 120 of its arbor 42 engaging an abutment 122 attached below it to the upper surface of the carriage 16. Extending inwardly toward the post 6 from each arbor 42 and secured to the latter as by screws 124 is a projection 126 (Figure 5), and extending outwardly from and fixedly secured as by screws 127 to the periphery of the upper supporting member 6, below the cam member 54, is a shelf member 128. This shelf member is located at the proper height and angular position relative to lobe 60 on the cam member that its bearing surface 132 will slidably receive and support the leading end of the projection 126 as the follower 50 on its arbor 42 rides off the dwell section 64 of that lobe. The bearing surface 132 and the cooperating bearing surface 134 on the projection 126 are both horizontal, so that during the period while they are in overlapping engagement the weight 40 neither rises nor falls, it being understood that the follower 50 during this period travels clear of the lower cam track 58. The bearing surface 132 terminates in the direction of movement of the carriage in an abrupt drop-off edge 136, and a similar abrupt terminus is provided at the trailing end of the projection 126 to effect a quick release of the weight as the projection 126 moves out of engagement with the shelf member 128. While the follower 50 is travelling over cam lobe 60 and during the subsequent period that the projection 126 is riding on the shelf member 128, the force of the weight is relieved from the tappet piston 48, resulting in the fluid pressure below the latter being also relieved. This period is of sufficient duration that the tappet's check-valve 138 (Figure 8a) has time to fully leave its seat. Immediately upon the shelf member releasing the weight and the latter re-engaging the piston, the check-valve 138 commences to return to its seat, and during this latter interval the fluid under pressure below the piston of the tappet has an opportunity to escape through the opening being closed by the check-valve. Since the tappet fore-shortens a certain amount during this process, the weight 40 will fall a distance equal to that amount. The amount which the weight falls at this time is measured by the dial indicator 82 which is fixed to the weight and has its operating stem 140 (Figures 5, 8) in registry with the stud 142. The stud 142 is adjustably fixed to the carriage 16 to obtain a "zero" reading of the dial indicator while the weight 40 is being supported by the shelf member 128.

Figure 10:
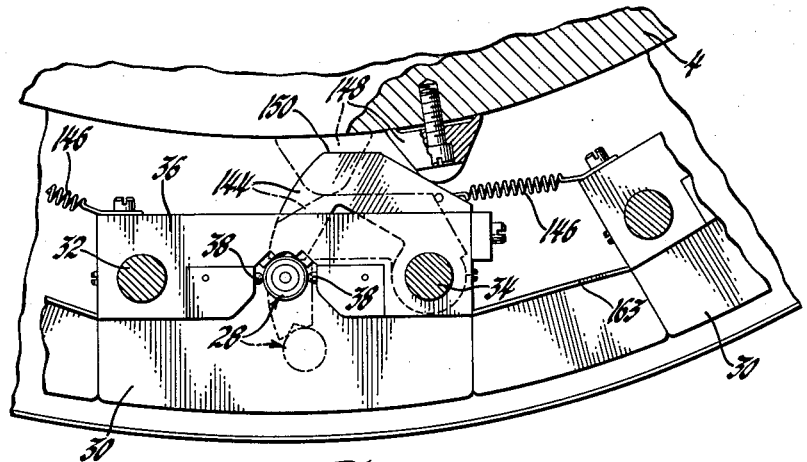
Figure 10 is a plan view taken from line 10—10 of Figure 8 with parts broken away and in section.

At the end of its test cycle (one revolution of the carriage 16) each tappet is removed from its test station by an ejector lever 144 associated therewith, in the manner illustrated in Figure 10. The ejector lever 144 is journaled at one end to the platform supporting bolt 34 and is biased out of contact with the tappet by the spring 146 to the position shown therein in solid lines. A stationary trip dog 148 is fixedly secured to the periphery of the lower supporting structure 4 in position to engage the end 150 of the ejector lever and rotate it about the bolt 34 to the position shown in broken lines, displacing the tappet.

As a means of insuring the proper full seating of each tappet inwardly in its U-shaped block 36 after the same is inserted therein by the operator at the start of the test cycle, there is provided a spring biased tracer device designated generally by the numeral 152 (Figures 3, 9). This device comprises a roller 154 carried on the inner end 155 of an arm 156 which is radially reciprocable relative to the carriage 16 in a bearing 158 fixed by a bracket 160 to the lower supporting structure 4. A compression spring 162 between the inner end 155 and bearing 158 biases the roller 154 into engagement with each tappet in its test station as the same is rotatively carried around by the carriage. As each tappet moves out of engagement with the roller the latter rides over the outer faces of the U-shaped tappet supporting blocks 36 and the guard plates 163 therebetween, camming the arm 156 outwardly against the spring 162. To limit the inward movement of the roller 154 under the biasing action of the spring while tracing over a test station in which for any reason a tappet has not been installed, a stop in the form of a pin 164 is provided on the arm 156 for engagement with the inner end of an elongated slot 166 in the bearing 158.

Figure 2:
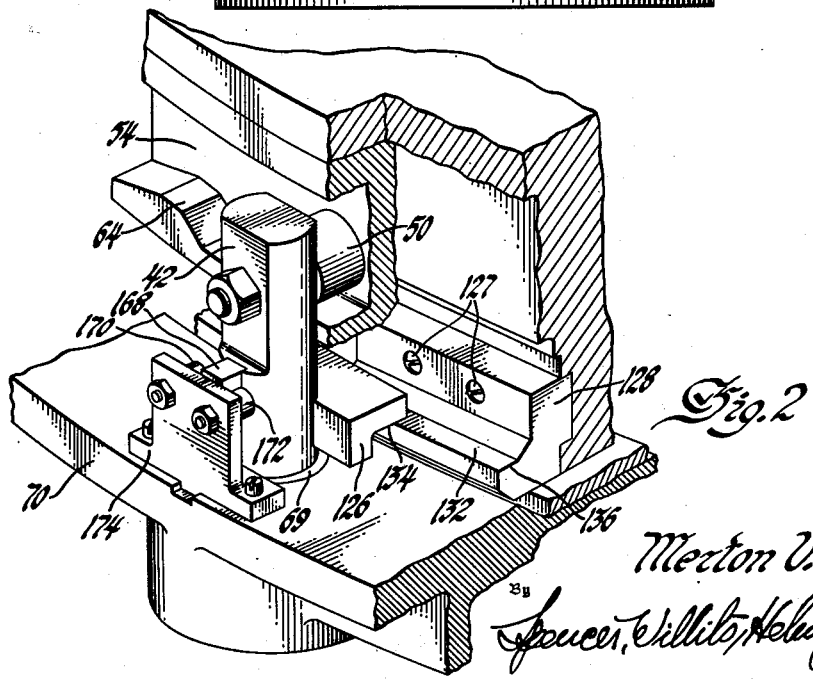
Figure 2 is an enlarged fragmentary view in perspective showing one of the tappet loading weights while slidably supported on the shelf member used in effecting the check-valve recovery test.

As will be seen in Figure 2 each arbor 42 is prevented from rotating about its own axis relative to the carriage 16 by a vertical key 168 fixedly secured thereto which passes between a pair of retaining rollers 170 and 172 carried by a bracket 174 secured to the carriage superstructure 70.

In operation, with the carriage 16 rotating continuously about the post 8, the operator inserts a tappet in each test station as the same is cleared by the lever 144 of the ejector mechanism. During the loading and unloading of a particular test station (see the test cycle timing diagram in Figure 11), lobe 62 on the cam member 54 is in engagement with the follower 50, holding the weight 40 in its uppermost position with the nose piece clear of the tappet as shown in Figure 5. Then, just prior to the weight and the nose piece being positively moved downward by engagement of the follower with the upper cam track lobe 67, switches 72 and 74 are both tripped "open" as their opening levers 86 and 96 engage the cams 92 and 98, extinguishing both lamps 76 and 80. The weight is positively depressed during the succeeding period of carriage rotation from points "D" to "E" a sufficient distance to move the tappet piston 48 downwardly to the upper end of its "leak-down range" (range of normal operation in an engine) in its cylinder 26. The rate of this downward movement is sufficient to build up a fluid pressure within the tappet effective to cause its check-valve 133 to engage its seat. After the follower reaches point "E," which is the start of the dwell section of cam lobe 67, the weight rests freely on the tappet piston for approximately 250 degrees of carriage rotation during which the leak-down test occurs.

At the end of the first 60 degrees (six seconds) of this period, point "F" in Figure 11, the closing lever 84 of the switch 72 passes opposite the actuating cam 100. If the tappet in the test station being considered has a leak-down rate not in excess of its specified maximum, the weight resting thereon during this six seconds will be at sufficient height at point "F" for the lever 84 to strike the cam 88, closing the switch 72 and lighting the lamp 76. On the other hand if the tappet demonstrates an excessive leak-down rate during this six seconds, the switch closing lever will miss the cam 88 and the lamp 76 will remain "out," indicating such excessive leak-down rate to the operator when the test station returns to the front of the machine.

Subsequently at point "S," terminating 200 degrees or 20 seconds of carriage rotation with the weight resting on the tappet, the closing lever 94 of switch 74 passes its actuating cam 100. At this time, if the tappet has a leak-down rate at or above its specified minimum, the weight resting thereon will have moved a sufficient distance downward during the preceding 20 seconds for the lever 94 to strike the cam 100, closing switch 74 and lighting lamp 80. If, on the other hand, the tappet's leak-down rate has been too slow, the switch closing lever 94 will fail to contact cam 100 and the lamp 80 will remain "out," indicating that fact to the operator.

When the test station reaches point "A" on the timing diagram, its follower 50 re-engages the cam member 54 and is lifted by the lobe 68, the weight thence being slidably supported for approximately 2½ seconds while its projection 126 rides on the shelf member 128. Upon the release of the projection 126 by the shelf member, the weight rapidly drops a distance equal to the amount which the tappet foreshortens while its check valve is regaining its seat, and this distance is indicated at this time to the operator by the reading of the dial indicator 82. In travelling between points "B" and "C" on the timing diagram, the follower 50 is raised by the lobe 62 on the cam member, effecting the re-elevation of the weight and the nose piece 46 clear of the tappet piston 48, the ejector lever 144 subsequently moving into engagement with its trip dog 143 to effect an ejection of the tappet from the test station.

I claim:

1. A machine for testing leak-down and check-valve recovery of hydraulic valve tappets and the like, comprising a continuously rotating carriage with means circumferentially spaced thereon for supporting the cylinder ends of a plurality of tappets in upright position, weights arranged above the respective tappets for movement downwardly against the tappet pistons and rotatively carried therewith by the carriage, each of the weights having a cam follower attached thereto, a stationary cam member positioned for engagement by the follower of each weight during a portion of each revolution of the carriage, said cam having a lower cam track with two spaced-apart lobes thereon, the first of said lobes being arranged to effect a lifting of each successive weight to a predetermined height from which the same is to be subsequently dropped for the check-valve recovery test, the second of said lobes being effective after the check-valve recovery test to lift and hold each successive weight clear of the tappet piston for an extended period of time during which the tappet under such weight may be removed from the machine and another installed in its place, said cam member also having an upper cam track with one lobe thereon arranged to effect a positive downward movement of each successive weight at the end of said period to a predetermined height for the start of the leak-down test.

2. A machine for automatically testing hydraulic tappets and the like both for rate of leak-down underload and for check-valve recovery, comprising a continuously moving carriage provided with means for supporting the cylinders of a plurality of tappets in spaced upright positions, individual tappet loading weights carried by the carriage and having guided vertical movement relative thereto, said weights being located above their respective tappets and adapted to be rested upon the tappet pistons, a stationary cam member operatively engageable by each successive weight as the same travels with the carriage and comprising a plurality of surfaces to effect first, a lifting of the weight to a height clear of the tappet piston, second, a positive downward movement of the weight against the tappet piston and continuing with the positive downward movement of both the weight and the piston a predetermined distance, third, a release of the weight to permit it to move the tappet piston downward by force of gravity a further predetermined distance, fourth, a re-elevation of the weight a predetermined distance, and fifth, a release of the weight, a stationary horizontal shelf positioned to slidably support the weight at the height from which they are last released by the cam, said shelf having an edge at which the slidable support for the weights abruptly terminates.

3. A machine for testing the leak-down and check-valve recovery characteristics of hydraulic valve tappets and the like, comprising a stationary frame including oppositely spaced upper and lower carriage supporting structures rigidly interconnected by a center post, a carriage journaled to the post for rotation between the supporting structures, a plurality of outwardly and upwardly open holders for supporting the tappets during the test, said holders being circumferentially spaced from each other around the carriage and rigidly secured thereto, means for insuring that tappets placed in the holders for test are fully seated therein, said means including a member movably guided by the frame and biased into contact with the outwardly facing portions of each successive holder and tappet therein as the same is moved opposite the member by the rotation of the carriage, arbors carried by the carriage and slidably guided thereby for end-wise movement downward against the pistons of the tappets in the holders, weights on the arbors for simulating engine valve spring loads on the tappet pistons during the leakdown portion of the test, cam followers connected to the arbors, a stationary cam member secured to the frame and engageable by each successive follower during each revolution of the carriage to effect first a lifting and subsequent release of its weight for the check-valve recovery test, then a lifting and holding of each successive weight clear of the tappet piston to accommodate the discharge and reloading of its tappet holder, and finally a positive downward movement of the weight to effect a predetermined uniform foreshortening of each successive tappet preliminary to releasing the weight for the start of the leak-down test, an electric power source a pair of electrical switches carried by each weight, stationary members arranged to actuate said switches to closed positions in accordance with the height of the switches after different predetermined degrees of rotation of the carriage, and signal means electrically connected in parallel to said power source through said switches and responsive to the closing of the switches for indicating their respective closed conditions and thereby the rate of foreshortening or leak-down of the tappets while their respective weights rest freely on the tappet pistons and a driver connected to the carriage for effecting its rotation at a sufficiently slow speed to permit perception of said signals by the operator.

4. Apparatus for testing hydraulic tappets and the like for rate of leak-down underload, comprising a member for supporting the tappet cylinder in upright position, a weight having guided vertical movements relative to the member and adapted when released to engage and apply a constant axial force downward upon the tappet piston, a cam member continuously driven relative to said tappet supporting member and having surfaces operatively engageable with the weight to effect a cycle of operations including, first, a positive lifting of the weight clear of the tappet piston, second, a positive downward movement of both the weight and the piston a predetermined distance, and third, a release of the weight to permit it to move the piston downward by force of gravity a further predetermined distance.

5. Apparatus for testing hydraulic tappets and the like for rate of leak-down underload, comprising a member for supporting the tappet cylinder in upright position, a weight having guided vertical movements relative to the member and adapted when released to effect loading of the tappet through the application of a constant downward axial force upon the tappet piston, means including a cam member continuously rotated relative to the tappet supporting member for controlling the movements of the weight, said cam having surfaces being operatively engageable with the weight to effect a cycle of operations including, first, a positive lifting of the weight clear of the tappet piston, second, a positive downward movement of both the weight and the piston a predetermined distance, and third, a release of the weight to permit it to move the piston downward by force of gravity a further predetermined distance.

6. In a machine for testing the check-valve recovery of hydraulic valve tappets and the like, a movable carriage for carrying a tappet and supporting one end thereof during the test, means connected to the carriage for effecting its movement during the test, a weight for applying a foreshortening load to the tappet, said weight being carried by the carriage and adapted to rest on the opposite end of the tappet, a stationary structure including a cam member, said weight having a portion arranged to engage the cam member as the weight is moved relative thereto by the carriage, said cam member being effective upon its engagement by said weight portion to elevate the weight to a predetermined height, said structure having a portion arranged to slidably receive and support the weight at said elevated height as the weight is released by the cam member, said structure portion terminating in the direction of movement of the weight with an abrupt drop-off edge for effecting a quick release of the weight as the weight passes thereover, indicating means carried by the weight and in registry with the carriage for automatically measuring the distance through which the weight falls immediately following its release by said structure portion.

7. In a machine for testing the check-valve recovery of hydraulic valve tappets and the like, a rotatable carriage for carrying a plurality of tappets while supporting one end of each thereof, means connected to the carriage for effecting its rotation at constant speed, weights for applying foreshortening loads to the respective tappets, said weights being carried by the carriage and adapted to rest on the opposite ends of the tappets, a stationary structure including a cam member, each of said weights having a portion arranged to engage the cam member as the weight is moved relative thereto by the rotating carriage, said cam member being effective upon its engagement by the weight portions to successively elevate their respective weights to a predetermined height, said structure having a portion arranged to slidably receive and support each successive weight at said elevated height as each is disengaged by the cam member, said structure portion terminating in the direction of movement of the weights with an abrupt drop-off edge for effecting a quick release of each successive weight as it passes thereover, and indicating means responsive to relative movement between each weight and the carriage for automatically measuring the amount which the tappets foreshorten immediately following the release of their respective weights by said structure portion.

8. A machine for testing leak-down and check-valve recovery of hydraulic tappets, comprising a continuously rotating carriage with means circumferentially spaced thereon for supporting the cylinder ends of a plurality of tappets in upright position, weights arranged above the respective tappets for movement downwardly against the pistons thereof and rotatively carried therewith by the carriage, each of the weights having a cam follower attached thereto, a stationary cam member having a lower cam surface and an upper cam surface operatively engaged by the follower of each weight during portions of each revolution of the carriage, a first lobe on the lower cam surface arranged to effect a lifting of the weight to a predetermined height preparatory to making the check-valve recovery test, a second lobe on the lower cam surface for supporting the weight clear of the tappet during installation and removal of the tappets from the machine, a lobe on the upper cam surface effective upon the follower leaving the second lobe of said lower surface to positively move the weight and its associated tappet piston downwardly a predetermined distance preparatory to making the leak-down test, a projection on each of said weights, a stationary shelf having a horizontal surface for slidably receiving and supporting said projection as the follower leaves the first lobe of said lower cam surface, said shelf terminating in an abrupt drop-off edge for effecting a quick release of the weight as the projection passes thereover, indicating means carried by the weights for automatically measuring the distance through which each weight drops relative to the carriage immediately upon being released by said shelf, a pair of lamps for each weight to indicate the leak-down rate of the tappet thereunder during the leak-down test, parallel electrical circuits each including a switch carried by the weight for connecting the respective lamps to a power source, each of said switches having a switch closing lever and a switch opening lever, two pairs of stationary switch lever actuating cams positioned in the rotative paths of the switch levers, one pair of said actuating cams being arranged to positively actuate the opening lever of each switch to open position preparatory to the start of the leak-down test, the other pair of said actuating cams being arranged to subsequently actuate the closing lever of each switch to closed position only upon the occasions respectively of the tappets demonstrating leak-down rates above the minimum and below the maximum predetermined limits, and means for rotating the carriage at a predetermined speed sufficiently slow to permit visual observation of the operation of said lamps.

9. A machine for testing the leak-down rate of hydraulic tappets and the like, comprising a continuously rotating carriage with means for supporting the cylinders of a plurality of tappets in circumferentially spaced upright positions thereon, a stationary frame rotatably supporting the carriage, vertical arbors carried by the carriage and slidably supported thereby for end-wise engagement with the pistons of the respective tappets, a roller follower secured to the upper end of each arbor, a stationary cam member fixed to the frame in position to engage each successive follower and effect a lifting of its arbor clear of the tappet thereunder during a portion of each revolution of the carriage, a weight fixed to each arbor for forcing the piston of the tappet thereunder to leak-down in its cylinder during another portion of each revolution of the carriage when the follower secured to the arbor is disengaged from the cam, two electric lamps carried by each weight for indicating the distance which the tappet thereunder leaks down under the force of said weight, parallel circuits connecting said lamps to a source of power, each of said circuits including a circuit opening and closing switch carried by the weight, stationary members secured to the frame and arranged to actuate each of the switches to open position preparatory to the start of the leak-down test, and other stationary members secured to the frame and arranged to subsequently actuate said switches to closed positions after different predetermined lengths of time during said other portion of each carriage revolution, provided that the tappet leak-down distance is not greater than a predetermined value during one of said times and not less than said value during the other of said times, said carriage having a sufficiently slow rotating speed to permit visual observation of the operation of said lamps during at least the portion of each revolution of the carriage between successive tappet leak-down tests.

MERTON V. ALBAUGH.

REFERENCES CITED

The following references are of record in the file of this patent:

UNITED STATES PATENTS

| Number | Name | Date |
| --- | --- | --- |
| 1,962,174 | Christman | June 12, 1934 |
| 2,334,970 | Voorhies | Nov. 23, 1943 |